United States Patent [19]

Downs

[11] Patent Number: 4,979,679
[45] Date of Patent: Dec. 25, 1990

[54] U.V. RESISTANT ZINC COATED PVC OR RELATED PLASTIC PIPE

[76] Inventor: Ernest W. Downs, 1990 Wolfangel Rd., Cincinnati, Ohio 45255

[21] Appl. No.: 414,210

[22] Filed: Sep. 29, 1989

[51] Int. Cl.$^5$ .................. B05B 13/00; F16L 58/08
[52] U.S. Cl. .................. 239/548; 239/602; 239/DIG. 19; 138/103; 138/143; 138/DIG. 10; 427/34; 427/37
[58] Field of Search ........... 239/548, 602, DIG. 19; 138/103, 137, 143, 178, DIG. 10; 427/34, 37, 423

[56] References Cited

U.S. PATENT DOCUMENTS

| Re: 29,375 | 8/1977 | Thiele . |
| 2,918,394 | 12/1959 | Smith . |
| 3,007,203 | 11/1961 | Ammons . |
| 3,066,870 | 12/1962 | Hanson . |
| 3,097,668 | 7/1963 | Langer . |
| 3,257,079 | 6/1966 | Ross . |
| 3,898,369 | 8/1975 | Clabburn . |
| 3,931,836 | 1/1976 | Thiele . |
| 4,078,097 | 3/1978 | Miller ................................ 427/34 |
| 4,120,325 | 10/1978 | de Putter . |
| 4,312,902 | 1/1982 | Murase et al. . |
| 4,663,182 | 5/1987 | Sanchez Fernandez ............ 427/37 |

Primary Examiner—Andres Kashnikow
Assistant Examiner—William Grant
Attorney, Agent, or Firm—William B. Noll

[57] ABSTRACT

A conduit and an integrated system for utilizing same, such as a foam control spray system for a sewage treatment facility, where said conduit is exposed to a hostile environment, such as solar ultraviolet (U.V.) radiation. The conduit and transmission components of such system comprise tubular members consisting of a solar U.V. degradable plastic, such as polyvinylchloride (PVC), having a preferred outer layer of metallic zinc diffusion bonded thereto, such as by spray arc metallizing the zinc onto the plastic surface, whereby the zinc prevents deterioration or breakdown of the plastic from solar U.V. radiation.

19 Claims, 3 Drawing Sheets

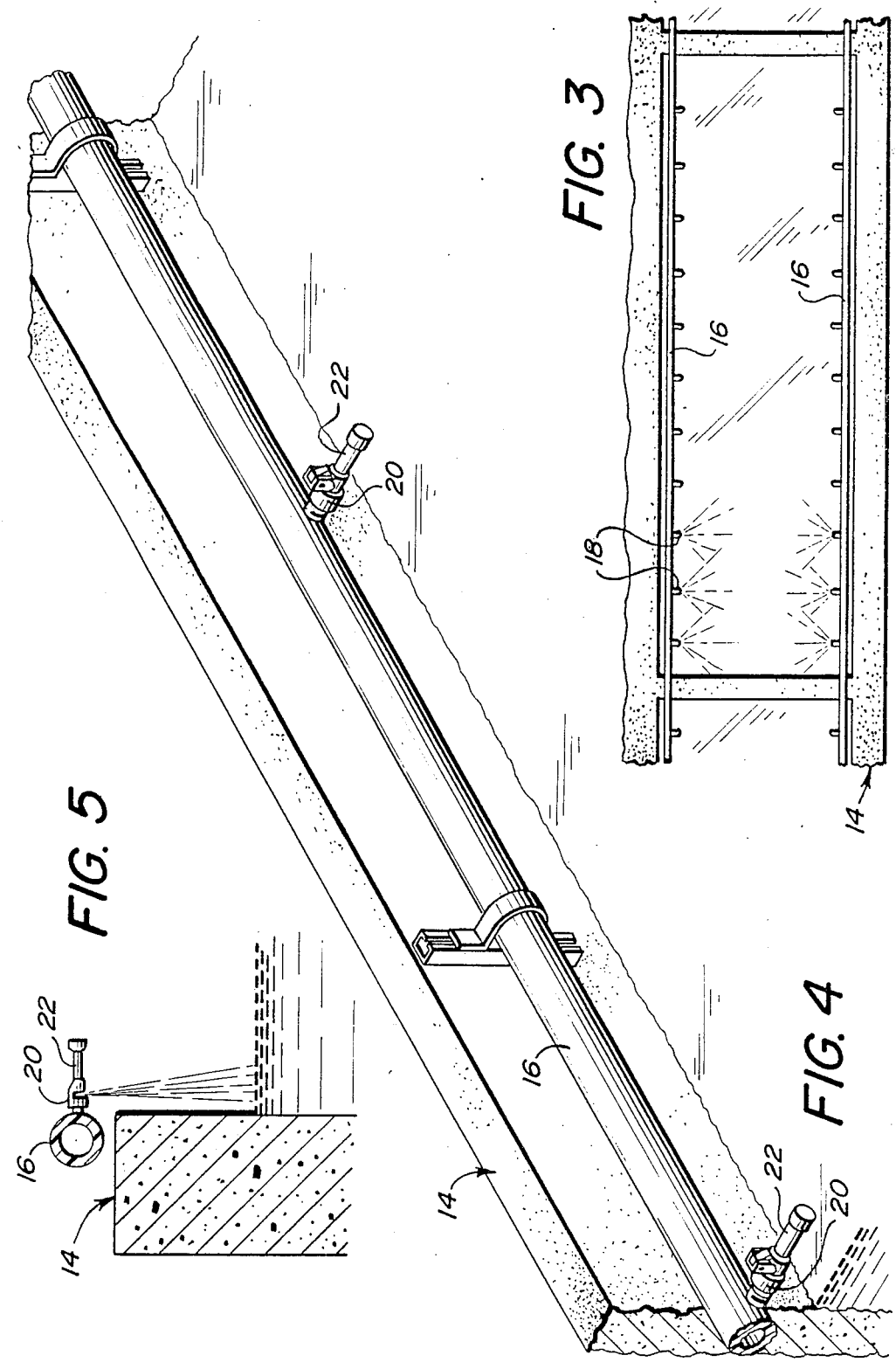

U.V. RESISTANT ZINC COATED PVC OR RELATED PLASTIC PIPE

FIELD OF INVENTION

A conduit or pipe and an integrated system for utilizing same, for the transmission of a fluid medium.

BACKGROUND OF THE INVENTION

A preferred embodiment of the present invention is directed to a solar ultra violet (U.V.) radiation resistant, zinc coated polyvinylchloride (PVC) or related plastic pipe which may be integrated into a fluid transmission system which heretofore had been the exclusive domain of metal pipe, particularly stainless steel.

PVC, or related plastic materials, have been developed as a suitable material for fluid transmission, such as in enclosed environments, namely household or commercial plumbing systems, and for underground transmission systems, and the like. PVC, for example, is considerably less expensive than copper piping, it's light weight, readily fabricated and coupled, and it's corrosion resistant. However, a significant shortcoming of PVC, and related light-sensitive plastic pipe, insofar as exposed environmental applications are concerned, is its inability to resist solar U.V. breakdown. That is, PVC deteriorates under prolonged exposure to sunlight. It is theorized that there is a molecular breakdown caused by solar U.V. radiation. Such breakdown can manifest itself in a brittle or jagged failure of the PVC, which may be the result of loading. In contrast, an unaffected PVC, when overloaded, will exhibit a rather smooth break. There have been commercial attempts to prevent such breakdown by chemically or metallurgically modifying the PVC, such as by the inclusion therein of costly filler materials. However, such attempts defeat the purpose or goal of providing a low cost material resistant to solar U.V. breakdown.

Solar U.V. breakdown of plastic pipe is known from the teachings of Smith U.S. Pat. No. 2,918,394. This patent discloses a multi-layered product prepared by a complex fabricating procedure and consists of a pipe or hose made from two discrete layers, a first inner layer of substantially crystalline polyolefinic material, and a second outer layer comprising an organic polyisocyanate adduct. The outer layer has a high abrasion resistance and is adhesively bonded to the inner layer. According to the disclosure of this patent, many of the adducts are opaque and will not transmit sunlight, which sunlight causes ultraviolet breakdown of the inner layer. The patent indicates that excellent protection against sunlight can also be obtained by forming a surface deposit of metal, such as, for example, aluminum, on the inner layer by vacuum deposition. The metallic deposit acts as a mirror and can reflect all light, thus protecting the inner layer.

Some apparent limitations of the Smith product and fabrication procedure is that it requires vacuum deposition of metal, a procedure which naturally limits the product to small sizes, and is not applicable to any field work applications. Further, vacuum deposition of metal also does not form a good bond with the underlying plastic. It can be easily scratched or damaged and often will flake off leaving the plastic exposed. Presumably, that is why a protective coating must be applied over the plated surface, as stated in the patent.

Other prior art of interest is taught in Putter U.S. Pat. No. 4,120,325, and Langer U.S. Pat. No. 3,097,668. The patent to Putter discloses a practice for coating the surface of a pipe to promote electrical conductivity. Langer, on the other hand, refers to metallic spraying by the "flame" spray method which produces hot temperatures at the plastic surface due to high gas temperatures. This will melt the plastic. Langer goes on to state that metallic spraying would not be applicable to parts with curved surfaces. This is totally contrary to the present invention, and in fact teaches one skilled in the art away from the solution achieved herein.

The present invention, as more fully described hereinafter, relates to a cost effective conduit or pipe, and to the manufacture thereof, which pipe is rendered resistant to solar ultraviolet breakdown, and thus provide for environmentally exposed uses, such as a foam control spray system for use in a sewage treatment facility. That is, such system may comprise multiple PVC plastic pipes and spray nozzles coated with a diffusion bonded layer of metallic zinc or zinc alloy to prevent solar U.V. breakdown of such pipes and nozzles. Such invention will become more apparent from the following description, particularly when read in conjunction with the accompanying drawings.

SUMMARY OF THE INVENTION

The cost effective product of this invention is achieved by the use of a conduit, and its preferred use in an integrated system, such as a foam control spray system for a sewage treatment facility, where said conduit is exposed to a hostile environment, such as solar ultraviolet (U.V.) radiation, or other hostile environments such as chemically active underground systems. The conduit and transmission components of such system comprise tubular members consisting of a U.V. degradable plastic, such as polyvinylchloride (PVC), having a preferred outer layer of metallic zinc diffusion bonded thereto, whereby the zinc prevents deterioration or breakdown of the plastic from solar U.V. radiation. Such conduit is prepared by a method which includes the step of texturizing the surface of the plastic, such as by chemical or mechanical means, and applying metallic zinc thereto by a process known as arc metallizing.

BRIEF DESCRIPTION OF PREFERRED EMBODIMENT

FIG. 3 is a top view of a typical sewage treatment aeration tank which can utilize a foam control spray system of the type taught by this invention.

FIG. 4 is an enlarged, partial perspective view of a foam control spray system as taught by this invention.

FIG. 5 is a partial side elevation of the system of FIG. 3.

DETAILED DESCRIPTION OF PREFERRED EMBODIMENT

This invention is preferably directed to solar U.V. radiation resistant plastic pipe, and to its method of manufacture. More particularly, this invention relates to a method of rendering solar ultraviolet sensitive plastic pipe suitable for use in hostile environments, particularly exposed applications, such as a foam control spray system for a sewage treatment facility.

Figure 1:
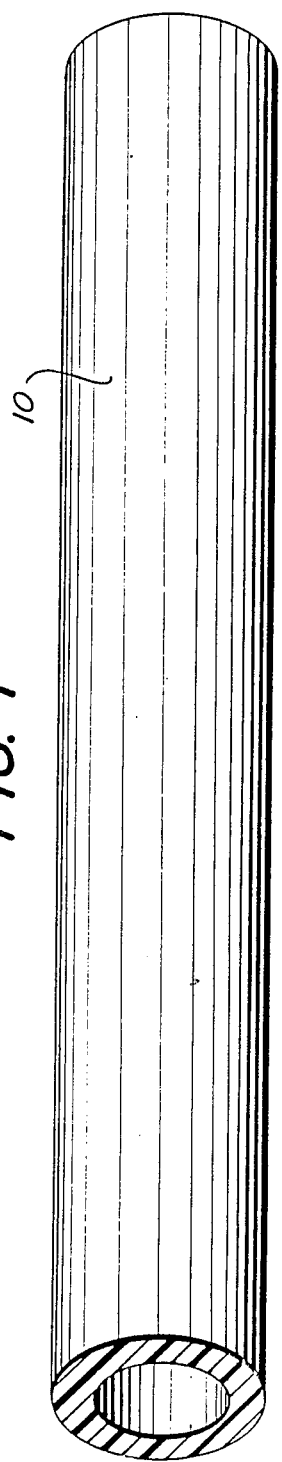
FIG. 1 is a perspective view of a conduit or pipe in accordance with this invention.
Figure 2:
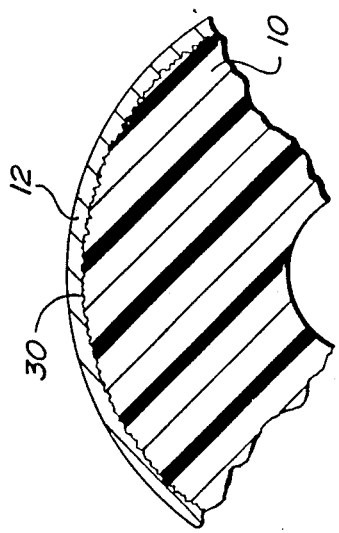
FIG. 2 is an enlarged, partial sectional view of the conduit or pipe of FIG. 1, illustrating features at the interface of the product of this invention.

The pipe of this invention, illustrated in perspective in FIG. 1, and in section in FIG. 2, comprises a tubular body 10 formed of a solar ultraviolet sensitive plastic, such as polyvinylchloride (PVC). Preferably about the surface thereof is a layer 12 of metallic zinc or zinc alloy diffusion bonded to the body 10. The manner of applying such zinc, or zinc alloy, to the plastic surface will be described in greater detail hereinafter.

An application of the product hereof is illustrated in FIGS. 3 to 5. In sewage treatment facilities a series of aligned aeration tanks 14 are used for the treatment of sewage. A typical tank, shown in such Figures, includes along each side thereof a spray system consisting of a water feed pipe 16 and a plurality of spray nozzles 18, where only several are shown for illustrative purposes. Such nozzles, described more fully in Hanson U.S. Pat. No. 3,066,870, are shown in perspective in FIG. 3. The purpose thereof is to provide a flat-fan, spray pattern over the sewage to suppress or control the aeration foam.

The spray pattern, and hence the foam control, is achieved by a nozzle or fixed body 20 in communication with feed pipe 16, and a pivotal nozzle part 22, swingably attached to nozzle body 20. The part, disposed adjacent the central opening water outlet from the nozzle body 20, is provided with a water diverter head to react against the flow of water through the nozzle body 20, thus causing the downward, fan-like spray pattern (see FIG. 4). Such a system has been demonstrated as an effective and efficient foam control system for a sewage treatment facility.

Heretofore it was necessary to fabricate such a system using metal pipe because the plastic pipe would deteriorate from the U.V. exposure. This was an expensive and not always corrosion resistant solution. With the present invention a low-cost, effective system has been found which now permits the substitution of an inexpensive solar ultraviolet sensitive plastic for the piping.

The ability to use solar ultraviolet sensitive plastics, such as PVC, is achieved by a method known as arc spray metallizing. More precisely, the surface of the plastic plastic pipe and components, such as the spray nozzles used in the foam control system of FIGS. 3 to 5, are texturized 30 (FIG. 2) by chemical, i.e. etching, or mechanical means, such as sand blasting, to render such surface receptive to the zinc or alloy thereof. It will be appreciated that to insure the integrity of solar ultraviolet sensitive plastic, such as PVC, there are temperature constraints that must be satisfied. That is, operating temperatures are typically limited to a maximum of about 140°F. Accordingly, a procedure had to be selected to apply the metal coating so as not to affect the integrity of the plastic. In this regard, the process of arc spray metallizing is required. Such process allows for the application of low melting point metals or alloys, i.e. zinc, at a relatively low temperature onto the plastic. The arc metallizing process, as known, feeds two metal or alloy wires at a diverging angle, simultaneously and continuously at a uniform rate of speed through electrical contact blocks in a nozzle gun. This electrically energizes the wires and guides them to an intersecting point. Where the wires intersect, an electric arc is established, whereby an area of molten metal is generated. Behind the intersection point within the nozzle gun is located a high velocity stream of air which produces and directs the fine molten metal spray toward the plastic component to be coated. The nozzle gun is typically located about 12 to 14 inches from the plastic surface, which allows for some cooling thereof before the molten metal impacts against the surface of the plastic pipe. By the use of this readily mobile procedure, applications of the metallic coating may be made in the field, i.e. on site location, or controlled environments, as required. In either case, such process insures a tenacious, diffusion bonded layer of from 0.005 to 0.010" thickness of a low-melting point metal, such as zinc or alloys thereof, to the texturized plastic surface.

Other metal spraying techniques, known commercially as flame spraying or plasma arc spraying, operate at considerably higher temperatures, where such temperatures would destroy or significantly alter the physical integrity of the plastic. Even with arc spray metallizing, low melting point alloys, such as zinc, must be used. By way of reference, such low-melting point (M.P.) alloys should have an M.P. of less than about 1000° F., preferably between about 700° to 800° F., a range suitable for zinc which melts at about 782° F. Aluminum, for example, with a melting point of about 1215° F., was found to char and flake off of the texturized plastic. Thus, two critical features hereof are the use of zinc or other low-melting alloy, and a low temperature application process, such as arc spray metallizing.

Based on an examination and analysis of the product illustrated in FIG. 1, it was observed that a coating density of between 70 and 80% was achieved, with a thickness of between about 0.005 and 0.010". Such a coating is sufficient to provide protection to the solar U.V. sensitive plastic pipe or component. Further, a unique relationship was observed with the combination of zinc on PVC. Even though the operating or useful range of PVC is limited, it will experience thermal changes resulting in expansion and/or contraction. It was observed that the zinc layer appears to expand or contract, as the case may be, by a comparable amount. It was theorized that as the molten metal droplets impact against the plastic surface, individual flat platelets are formed and overlap. As the pipe and coating are subjected to thermal changes, the platelets appear to slide relative to one another thereby remaining adherent and impervious to the atmosphere. Thus, even with such thermal changes, the zinc or other metal alloy layer remains tightly adherent to the PVC.

By way of specific reference, in the practice of this invention, a spray arc metallizing gun, Model No. BP-400, manufactured by Miller Thermal, Inc., of Appleton, WI, having a spray capacity of 75 lbs/hr of zinc, where about one pound of zinc will cover approximately 1 ⅓ sq. ft. of surface to a depth of 0.008 to 0.010", was successfully used to coat a PVC pipe, having a wall thickness of about ¼", in the manner as taught herein. In a term employed in the art, a "bond strength" of approximately 1500 psi was achieved thereby.

Having defined the invention in its most preferred embodiment, it is not intended that the invention be so limited except by the following claims.

I claim:

1. A conduit for the transmission of a fluid medium therethrough, said conduit adaptable for use in hostile environments where exposure to solar ultraviolet (U.V.) radiation, or chemically active underground systems, may result in a breakdown of such conduit, comprising a tubular body consisting essentially of a solar U.V. degradable plastic having an outer layer of a low-melting point metal or alloy diffusion bonded thereto, said metallic layer being of sufficient thickness to protect said plastic body against breakdown by exposure to said hostile environment.

2. The conduit according to claim 1, wherein said plastic is polyvinylchloride (PVC).

3. The conduit according to claim 1, wherein said low-melting point metal or alloy has a melting point of less than about 1000° F.

4. The conduit according to claim 1, wherein said metallic layer is zinc or alloy thereof.

5. The conduit according to claim 4, wherein said zinc or zinc alloy layer has a thickness of between 0.005 and 0.010 inches.

6. The conduit according to claim 1, wherein said plastic is characterized by a textured surface to facilitate the diffusion bonding of said low-melting point metal or alloy thereto.

7. An integrated system of pipes and components forming part of a foam control spray system for the transmission of a fluid medium therethrough in a sewage treatment facility, where such integrated system is exposed to solar ultraviolet (U.V.) radiation, consisting essentially of one or more pipes and fluid spray nozzles in communication therewith, said pipes and nozzles being formed of a solar ultraviolet sensitive plastic having an outer layer of a low-melting point metal, or alloy, diffusion bonded to the plastic pipes and nozzles, whereby said metallic layer is of sufficient thickness to protect said plastic pipes and nozzles against breakdown by said solar U.V. radiation.

8. The system according to claim 7, wherein said plastic is polyvinylchloride (PVC).

9. The system according to claim 7, wherein said low-melting point metal or alloy has a melting point of less than about 1000° F.

10. The system according to claim 7, wherein said metallic layer is zinc or alloy thereof.

11. The system according to claim 10, wherein said zinc or zinc alloy layer has a thickness of between 0.005 and 0.010 inches.

12. The system according to claim 7, wherein said plastic is characterized by a textured surface to facilitate the diffusion bonding of said zinc or alloy thereto.

13. A method of protecting solar ultraviolet sensitive plastic pipes and components against deterioration by ultraviolet (U.V.) radiation in environmentally exposed applications, consisting essentially of the steps of selecting a pipe or component formed of a solar U.V. radiation degradable plastic, texturing the external surfaces thereof, and diffusion bonding a metallized molten coating of a low melting point metal or alloy to such surfaces by an arc spray metallizing technique to retain the physical integrity of said plastic pipe or component, whereby said metallic layer protects said plastic pipe or component against breakdown by said solar U.V. radiation.

14. The method according to claim 13, wherein said plastic is polyvinylchloride (PVC).

15. The method according to claim 13, wherein said texturing is accomplished by chemical means.

16. The method according to claim 13, wherein said texturing is accomplished by mechanical means.

17. The method according to claim 13, wherein said low-melting point metal or alloy has a melting point of less than about 1000° F.

18. The method according to claim 13, wherein said metallic layer is zinc or alloy thereof.

19. The method according to claim 18, wherein said zinc or zinc alloy layer has a thickness of between 0.005 and 0.010 inches.

* * * * *